United States Patent [19]

Furuya et al.

[11] Patent Number: 5,042,624
[45] Date of Patent: Aug. 27, 1991

[54] HYDRAULIC SHOCK ABSORBER WITH PRE-LOADED VALVE FOR LINEAR VARIATION CHARACTERISTICS OF DAMPING FORCE

[75] Inventors: Takayuki Furuya; Fumiyuki Yamaoka, both of Kanagawa, Japan

[73] Assignee: Atsugi Unisia Corporation, Kanagawa, Japan

[21] Appl. No.: 413,066

[22] Filed: Sep. 27, 1989

[30] Foreign Application Priority Data

| Sep. 29, 1988 | [JP] | Japan | 63-127862[U] |
| Sep. 29, 1988 | [JP] | Japan | 63-127863[U] |
| Sep. 29, 1988 | [JP] | Japan | 63-127864 |

[51] Int. Cl.$^5$ ............................................. F16F 9/348
[52] U.S. Cl. ........................................ 188/280; 188/282; 188/317; 188/322.14; 188/322.15; 188/322.22
[58] Field of Search .................... 188/322.22, 322.15, 188/317, 322.14, 281, 282, 280, 322.13, 322.17, 322.18, 322.16, 320, 318

[56] References Cited

U.S. PATENT DOCUMENTS

| 2,740,500 | 4/1956 | Brundrett et al. | 188/322.15 |
| 3,134,460 | 5/1964 | DeCarbon | 188/322.15 X |
| 4,076,276 | 2/1978 | Wijnhoven et al. | 188/322.14 X |
| 4,768,629 | 9/1988 | Wössner | 188/322.14 X |
| 4,782,925 | 11/1988 | Grundei | 188/322.14 |
| 4,809,828 | 3/1989 | Nakazato | 188/320 X |
| 4,834,222 | 5/1989 | Kato et al. | 188/280 |
| 4,895,229 | 1/1990 | Kato | 188/317 X |
| 4,905,799 | 3/1990 | Yamaoka et al. | 188/322.15 |

FOREIGN PATENT DOCUMENTS

| 833574 | 2/1952 | Fed. Rep. of Germany . |
| 1678593 | 4/1954 | Fed. Rep. of Germany . |
| 2031158 | 12/1971 | Fed. Rep. of Germany . |
| 2109398 | 9/1972 | Fed. Rep. of Germany . |
| 65878 | 3/1956 | France . |
| 55-82539 | 6/1980 | Japan . |
| 618797 | 2/1949 | United Kingdom . |
| 1387150 | 3/1975 | United Kingdom . |
| 1582586 | 1/1981 | United Kingdom . |

Primary Examiner—Douglas C. Butler
Attorney, Agent, or Firm—Ronald P. Kananen

[57] ABSTRACT

A hydraulic shock absorber employs first and second stage disc valves arranged in tandem fashion. The first stage disc valve is provided for acting on a relatively small pressure difference for enhanced damping characteristics at a relatively low piston stroke speed range. On the other hand, the second stage disc valve is provided for acting on a greater pressure difference for generating damping a force at a higher piston stroke speed range. The second stage disc valve is initially pre-loaded at a predetermined magnitude of load so as to set a pressure relief point of the second stage disc valve at a desired piston stroke speed for better damping characteristics of the shock absorber.

12 Claims, 7 Drawing Sheets

PISTON MOTION

HYDRAULIC SHOCK ABSORBER WITH PRE-LOADED VALVE FOR LINEAR VARIATION CHARACTERISTICS OF DAMPING FORCE

BACKGROUND OF THE INVENTION

1. Field of the Invention

The present invention relates generally to a hydraulic shock absorber, suitable for use in an automotive suspension system. More specifically, the invention relates to a shock absorber having improved piston stroke speed dependent damping characteristics.

2. Description of the Background Art

In general, a hydraulic shock absorber generates a damping force determined by pressure difference across a flow restriction valve structure. As will be appreciated, the pressure difference is variable depending upon the magnitude of the flow restriction at the flow restriction valve structure and the working fluid flow rate. Working fluid flow rate is determined by both magnitude and speed of piston stroke.

When the shock absorber employing a constant orifice is used, the damping force varies at a rate substantially proportional to the square of the piston stroke speed. Therefore, the damping force tends to become insufficient at a relatively low piston stroke speed range so as not to generate a sufficient damping force for successfully damping relative displacement of a vehicular body and a road wheel.

In order to improve this, a two stage disc valve strategy has been proposed for generating a damping force for a relatively low speed piston stroke by a first stage valve and for a higher speed piston stroke by a second stage valve. Such a two stage disc valve strategy has been proposed in German Patent 833 574, for example. The proposed shock absorber has the first stage and second stage disc valves arranged in a tandem fashion. The first stage disc valve is principally active for generating a damping force at a relatively low piston stroke speed range. On the other hand, the second stage disc valve is principally active for generating a damping force at a higher piston stroke speed range. Therefore, combining the first and second stage disc valves, improved piston stroke speed dependent damping characteristics can be obtained. Namely, in the aforementioned German Patent, the damping force varies at a rate substantially proportional to a two-thirds ($\frac{2}{3}$) power of the piston stroke speed.

On the other hand, in view of the ease of tuning of an automotive suspension system for achieving both vehicular riding comfort and driving stability, it is desirable to provide a shock absorber having damping characteristics linearly proportional to the piston stroke speed. In view of this requirement, the conventionally proposed shock absorbers are not satisfactory.

SUMMARY OF THE INVENTION

Therefore, it is an object of the present invention to provide a shock absorber which can provide substantially linear damping characteristics in relation to piston stroke speed.

Another object of the invention is to provide a shock absorber having a pre-loaded valve member for providing a higher relief point for providing linear variation characteristics of damping force.

In order to accomplish the aforementioned and other objects, a hydraulic shock absorber, according to the present invention, employs first and second stage disc valves arranged in a tandem fashion. The first stage disc valve is provided for acting on a relatively small pressure difference for enhanced damping characteristics at a relatively low piston stroke speed range. On the other hand, the second stage disc valve is provided for acting on a greater pressure difference for generating a damping force at a higher piston stroke speed range. The second stage disc valve is initially pre-loaded at a predetermined magnitude of load so as to set a pressure relief point of the second stage disc valve at a desired piston stroke speed for better damping characteristics of the shock absorber.

According to one aspect of the invention, a hydraulic shock absorber comprises:

a hollow cylinder filled with a working fluid;

a piston thrustingly disposed within the interior space of the cylinder for defining first and second fluid chambers;

a fluid communication means for establishing fluid communication between the first and second chambers;

a flow restrictive first valve means associated with the fluid communication means for generating a first damping force in response to piston stroke in one direction, the first valve means generating the first damping force according to first variation characteristics when the piston stroke speed is lower than a first criterion and according to second variation characteristics when the piston stroke speed becomes in excess of the first criterion;

a flow restrictive second valve means associated with the fluid communication means and arranged in series with the first valve means, for generating a second damping force in response to piston stroke in the one direction, the second valve means generating the second damping force according to third variation characteristics when the piston stroke is lower than a second criterion and according to fourth variation characteristics when the piston stroke speed becomes in excess of the second criterion; and means for pre-loading the second valve means for adjusting the second criterion for setting a transition point between the third and fourth variation characteristics.

The first criterion may be set at a lower piston stroke speed than the second criterion. The first variation characteristics may have a greater gradient than that of the second variation characteristics in the piston stroke speed range lower than the first criterion, and the third variation characteristics have a smaller gradient than that of the fourth varying characteristics in the piston speed range lower than the second criterion.

In the preferred construction, the pre-loading means comprises a seat surface offset from the orientation perpendicular to an axis of the shock absorber for forcingly bending the second valve means for exerting a pre-load. Alternatively, the pre-loading means comprises a seat surface offset from the orientation perpendicular to an axis of the shock absorber and the second valve means is provided with a spring force toward the seat surface for self-inducing a pre-load. In the former case, the pre-loading means causes deformation of the second valve means in a direction away from the first valve means for exerting a pre-load. In the latter case, the pre-loading means causes deformation of the second valve for pre-loading, and the second valve means as seated on the seat surface serves as a means for restricting deformation of the first valve means.

The second valve means may be provided with a greater external diameter than the diameter of an outer circumferential edge of a seat surface on which the second valve means is seated, while the piston stroke speed is lower than the second criterion.

In the preferred construction, the first valve means comprises a first window opening defined on the piston and communicated with the fluid path, the window opening being surrounded by a first land having a first surface, and a first resilient valve means resiliently biased toward the surface for normally establishing sealing contact with the first surface and responsive to fluid flow in a first flow direction generated by the piston stroke in the one stroke direction for forming a first flow restrictive path for fluid communication from the first window opening and one of the first and second fluid chambers for generating the first damping force, and a second window opening formed on the piston in fluid communication with the first window opening, the second window opening being defined by a second land with a second surface, and a second resilient valve means resiliently biased toward the second surface for normally establishing sealing contact with the second surface and responsive to fluid flow in a first flow direction generated by the piston stroke in the one stroke direction for forming a second flow restrictive path for fluid communication between the first and second window openings for generating the second damping force.

Preferably, the shock absorber further comprises third and fourth valve means provided for generating a damping force in response to a fluid flow in a second direction opposite to the first direction, the third and fourth valve means being arranged in series and being so designed as to establish essentially linear variation characteristics of damping force depending upon piston stroke speed. In such case, the third valve means may be responsive to piston stroke for generating a third damping force variable according to first variation characteristics in relation to variation of the piston stroke speed in a piston stroke speed range lower than a third criterion and according to second variation characteristics when the piston stroke speed is in excess of the third criterion, and the fourth valve means may be responsive to the piston stroke for generating a fourth damping force variation according to third variation characteristics in relation to variation of the piston stroke speed when the piston stroke speed is lower than a fourth criterion and according to fourth variation characteristics when the piston stroke speed is in excess of the fourth criterion, wherein the third valve means comprises a third window opening defined on the piston and communicated with the fluid path, the window opening being surrounded by a third land having a third surface, and a third resilient valve means resiliently biased toward the surface for normally establishing sealing contact with the third surface and responsive to fluid flow in a second flow direction generated by the piston stroke in the other stroke direction for forming a third flow restrictive path for fluid communication from the third window opening and one of the first and second fluid chambers for generating the third damping force, and a second window opening formed on the piston in fluid communication with the third window opening, the fourth window opening being defined by a fourth land with a fourth surface, and a fourth resilient valve means resiliently biased toward the fourth surface for normally establishing sealing contact with the fourth surface and responsive to fluid flow in a second flow direction generated by the piston stroke in the other stroke direction for forming a fourth flow restrictive path for fluid communication between the first and fourth window openings for generating the fourth damping force.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIGS. 4(A), 4(B) and 4(C) are graphs showing variations of damping force relative to piston stroke speed, in which

DESCRIPTION OF THE PREFERRED EMBODIMENT

Figure 1:
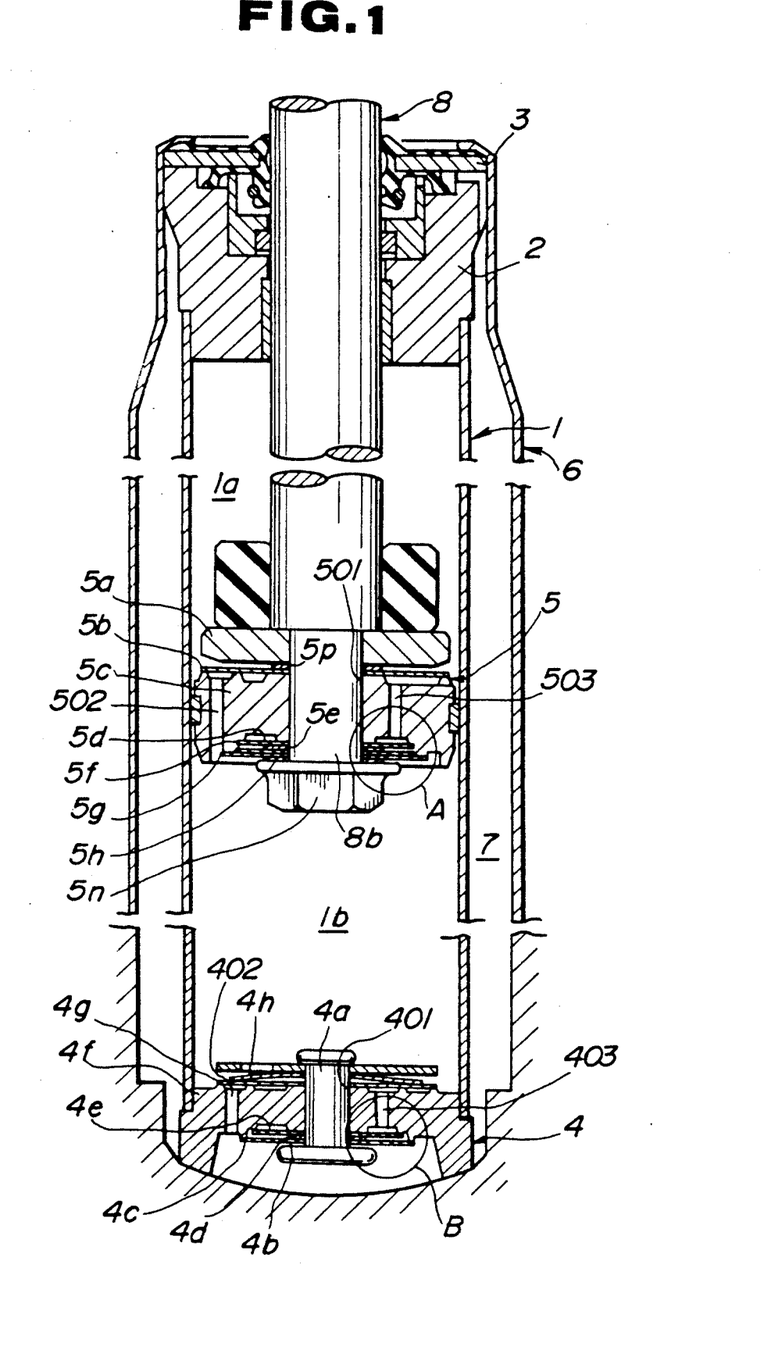
FIG. 1 is a section of the preferred embodiment of a shock absorber according to the present invention.

Referring now to the drawings, particularly to FIG. 1, the preferred embodiment of a hydraulic shock absorber, according to the present invention, employs a double action structure including inner and outer cylinders 1 and 6. The top end of the inner cylinder 1 is closed by a guide member 2 and a seal member 3. On the other hand, a bottom fitting assembly 4. Therefore, the inner cylinder 1 defines an enclosed space filled with a working fluid. A piston assembly 5 is disposed within the enclosed space of the inner cylinder 1 for thrusting movement therein and dividing the enclosed space into upper and low fluid chambers 1a and 1b. On the other hand, an annular reservoir chamber 7 is filled with a working fluid and working gas.

The piston assembly 5 is mounted on the lower end of a piston rod 8 for thrusting movement therewith. The piston assembly 5 comprises a retainer 5a, a check plate 5b, a piston body 5c, a first stage disc valve 5d, a washer 5e, a stopper plate 5f, a second stage disc valve 5g, a washer 5h, a collar 5j, a spring seat 5k and an assist spring 5m. These components are gathered at the smaller diameter section 8b of the piston rod 8 and firmly secured to the lower end by means of a fastening nut 5n which engages with a threaded portion 8a of the small diameter section 8b of the piston rod.

The piston body 5c defines a through opening 502 oriented in the vicinity of the outer circumference thereof. The through opening 502 may be hereafter referred to as an "outer axial opening". The piston body 5c also defines a through opening 503 oriented at an orientation close to a center opening 501 which receives the small diameter section 8b of the piston rod 8. The opening 503 will be hereafter referred to as an "inner axial opening". The upper end of the outer axial opening 502 is openably closed by means of the check plate 5b. The check plate 5b blocks fluid flow from the upper fluid chamber 1a to the lower fluid chamber 1b. On the other hand, the check plate 5b is responsive to the fluid pressure in the lower fluid chamber 1b for permitting fluid flow through a gap formed by deformation of the check plate from the lower fluid chamber 1b to the upper fluid chamber 1a.

Figure 2:
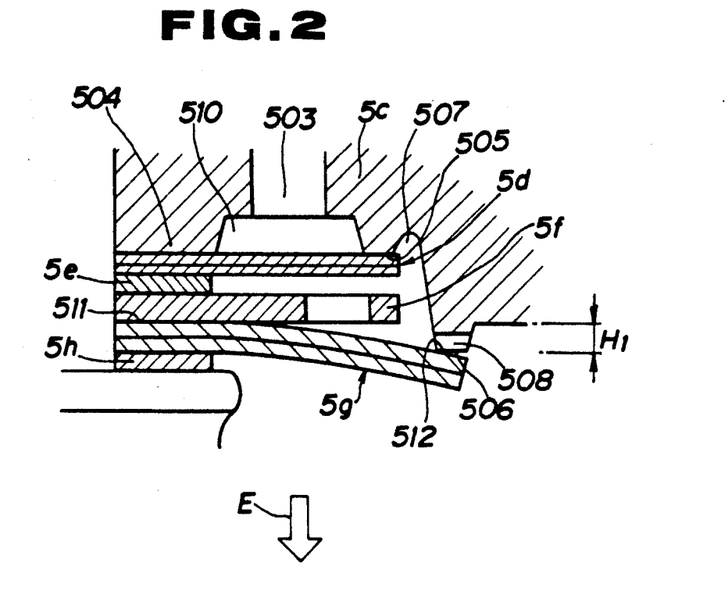
FIG. 2 is an enlarged section of the major part of a piston employed in the preferred embodiment of the shock absorber of FIG. 1, which is the detail in the encircled portion A in FIG. 1.

On the other hand, as shown in FIG. 2, the lower end of the inner axial opening 503 is closed by the first and second stage disc valves 5d and 5g. The first stage disc valve 5d is normally seated on inner and outer seat surfaces 504 and 505. A cross-sectionally essentially semi-circular groove 507 is formed adjacent the outer side seat surface 505. On the other hand, the second stage disc valve 5g is seated on annular seat surface 506 which is formed along the outer circumference of the piston body 5c. As can be seen from FIG. 2, the first stage disc valve 5d opposes the stopper plate 5f via the washer 5e. The circumferential edge of the washer 5e defines a support for deformation of the first stage disc valve 5d. The magnitude deformation of the first disc valve 5d is limited by the stopper plate 5f so that the maximum deformation magnitude corresponds to the thickness of the washer 5e. Once the circumferential edge of the first disc valve 5d comes into contact with the stopper plate, the intermediate portion of the first disc valve is gradually deformed with a progressively increased reaction force.

It should be appreciated that, in the shown embodiment, the first disc valve is provided with a relatively low spring constant so that it may react to a substantially small pressure difference between the upper and lower fluid chambers 1a and 1b. Therefore, even at a very low piston speed, the first disc valve 5d is deformed for permitting a corresponding flow rate of fluid flow for generating a damping force.

As seen from FIG. 2, the contact point 512 between the second stage disc valve 5g and the annular seat surface 506 is oriented at a downwardly offset position at a magnitude $H_1$ from the orientation of the lower surface of the stopper plate. On the other hand, one or more constant orifices 508 are formed between the second disc valve 5g and the seat surface 507 to permit minimum fluid flow. The constant orifice 508 may not be effective at an initial stage of the piston stroke until the first disc valve 5d is deformed at a given magnitude to establish a given fluid flow.

The second disc valve 5g is provided with a greater spring constant so as to provide greater resistance in deformation. The spring coefficient of the second disc valve 5g is so determined as to achieve a linear variation of the damping force depending upon the piston stroke magnitude and piston stroke speed.

The bottom fitting is provided with a bottom valve assembly 4. The bottom valve assembly 4 comprises outer and inner axial openings 402 and 403 defined through a body 4f of the fitting. The valve assembly also comprises a washer 4b, a second stage disc valve 4c, a washer 4d, a first stage disc valve 4e, a check plate 4g, a check spring 4h and a collar. These components are gathered and secured onto the fitting body 4f by means of fastening bolt 4a, for which fastening nut 4k is engaged. The upper end of the outer axial opening 402 is operably closed by the check plate 4g by seating onto seat surfaces defined on the upper surface of the fitting. Therefore, the fluid flow from the lower fluid chamber 1b to the reservoir chamber 7 is blocked and the fluid flow in the opposite direction is permitted.

Figure 3:
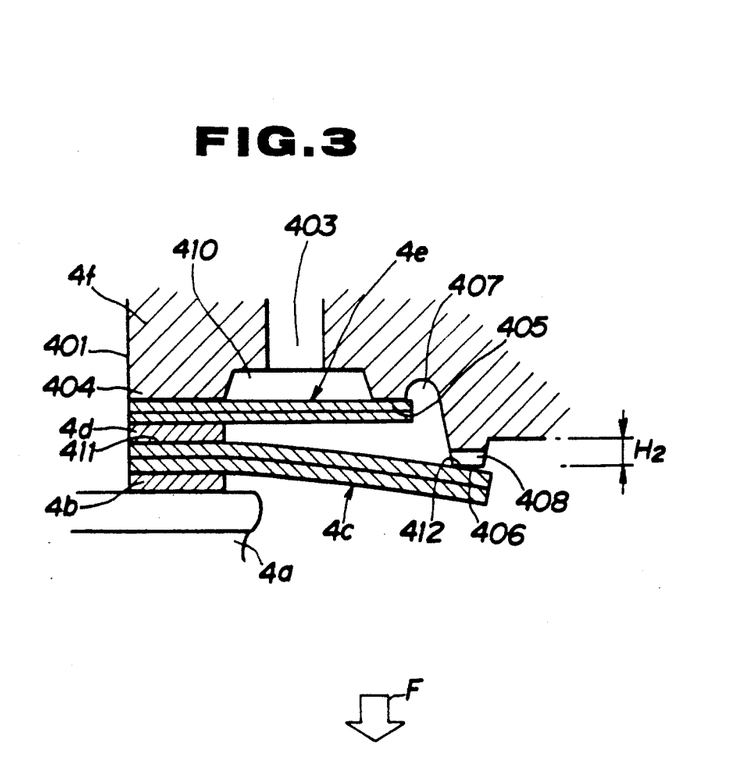
FIG. 3 is an enlarged section of the major part of a bottom valve employed in the preferred embodiment of the shock absorber of FIG. 1, which illustrates a detailed construction of the encircled portion B in FIG. 1.

On the other hand, as shown in FIG. 3, the first disc valve 4e openably closes the lower end of the inner axial opening 403 by seating onto the seat surfaces 404 and 405 respectively defined on the center boss section and an annular land extending circumferentially at the radially outer side of the inner axial opening 403. An essentially semi-circular groove 407 is formed immediately outside of the seat surface 405 and extends therealong. The second disc valve 4c is seated onto a seat surface 406 at the circumferential edge portion.

As seen from FIG. 3, the contact point 412 between the second stage disc valve 4c and the annular seat surface 406 is oriented at a downwardly offset position at a magnitude $H_2$ from the orientation of the lower surface of the stopper plate. One or more constant orifices 408 is formed through the seat surface 406 so as to provide a constant fluid flow at a minimum flow rate.

As can be seen from FIGS. 2 and 3, the bottom valve assembly operates substantially in the same manner to that valve assembly in the piston.

The operation of the shown embodiment of the shock absorber will be discussed herebelow with respect to respective of rebounding and bounding mode operations.

In the piston bounding mode stroke, the piston assembly 5 moves upwardly relative to the inner cylinder 1 for compressing the volume of the upper fluid chamber 1a and expanding the volume of the lower fluid chamber 1b. By variation of the volumes, a fluid pressure difference is generated so that the fluid pressure in the upper fluid chamber 1a becomes higher than in the lower fluid chamber 1b. Therefore, fluid flow from the upper fluid chamber 1a to the lower fluid chamber 1b is generated. Furthermore, because of lowering of the fluid pressure in the lower fluid chamber 1b, the fluid pressure in the reservoir chamber 7 becomes higher than that in the lower fluid chamber 1b for causing fluid flow through the bottom valve assembly. Therefore, working fluid in the upper fluid chamber 1a and the reservoir chamber 7 flows into the lower fluid chamber 1b until the pressure balance between the upper and lower fluid chambers and the reservoir chamber is established.

Figure 4A:
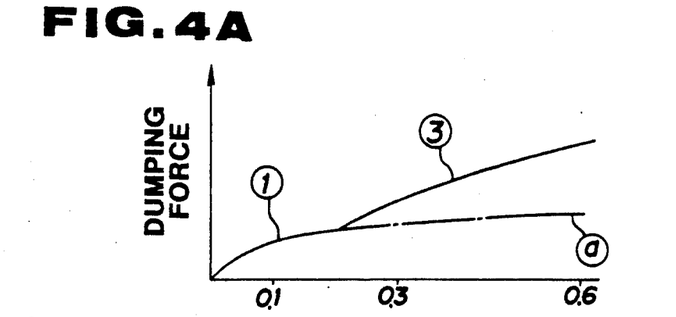
FIG. 4(A) shows damping characteristics of a first stage disc valve relative to the piston stroke speed.
Figure 4B:
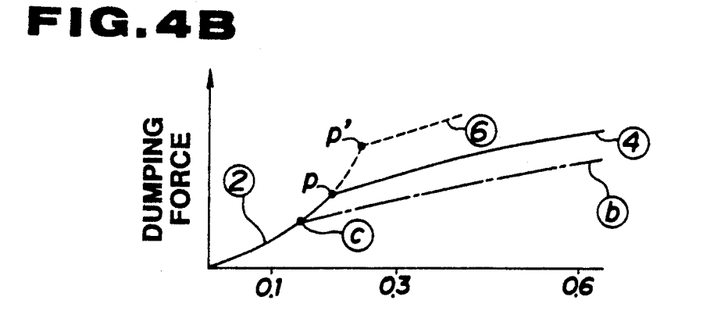
FIG. 4(B) shows damping characteristics of a second stage disc valve relative to the piston stroke speed.

During the piston rebounding stroke, the working fluid in the upper fluid chamber 1a flows into the inner axial opening 503. Against the fluid flow, the first and second disc valves 5d and 5g are active for providing fluid flow restriction and thus generating damping force. FIGS. 4(A) and 4(B) show damping characteristics of the respective individual first and second stage disc valves 5d and 5g, in relation to the piston stroke speed. As can be seen from FIG. 4(A), the first stage disc valve 5d is normally in a closed position for completely blocking fluid flow from the upper fluid chamber 1a to the lower fluid chamber 1b. The first stage disc valve 5d is responsive to even a relatively small pressure difference to cause deformation for forming a fluid flow orifice between the seat surface 506 to permit a limited amount of fluid flow from the upper fluid chamber to the lower fluid chamber. As a result, damping force is created as shown in FIG. 4(A). As can be seen, at the initial stage of the piston stroke, the damping force is increased in proportion to the piston stroke speed S in a rate of two-thirds power of the piston speed ($S^{(\frac{2}{3})}$) (as in the range (1) of FIG. 4(A). The damping force generated by the first stage disc valve is much greater than that generated by the constant orifice in the prior art. On the other hand, in the low piston stroke speed range, the second stage disc valve 5g is held seated on the associated seat surface 506. Therefore, during the low piston stroke speed range, only the constant orifices 508 are active for generating damping force. Therefore, as shown in the region (2) in FIG. 4(B), the second stage disc valve 5g generates damping force varying at a rate proportion to two power of the piston stroke speed ($S^2$).

When the circumferential edge of the first disc valve 5d comes into contact with the stopper plate 5f, the spring constant of the first disc valve becomes greater to vary the variation rate of the damping force to be at a greater rate. In FIG. 4(A), the point where the variation characteristics of the damping force is changed corresponds to the magnitude of the pressure difference at which the circumferential edge of the first disc valve comes into contact with stopper plate 5f. When the pressure difference has grown greater than the point above the relief point of the first stage disc valve 5d, the flow restriction path formed by the first stage disc valve 5d becomes substantially constant. As a result, the variation characteristics of the damping force relative to variation of the piston stroke speed becomes substantially corresponding to that of the constant orifice as shown in the region (3) of FIG. 4(A).

As set forth, the conventional constant orifice provides variation characteristics of the pressure difference proportional to the square of the fluid flow rate Q ($Q^2$). On the other hand, the variation characteristics of the pressure difference in the first disc valve of the invention is proportional to the two-thirds power of the fluid flow rate ($Q^{(\frac{2}{3})}$). As seen, in the shown embodiment, a relatively large damping force is generated at very initial stage of the piston stroke.

On the other hand, FIG. 4(B) shows the variation characteristics of the damping force versus the piston stroke speed at the second stage disc valve 5g. As set forth above, the second stage disc valve 5g is held at a closed position in the low piston stroke range. At this condition, the working fluid flows through the constant orifices 508. In the low piston stroke speed range, since the only constant orifice 508 is effective for generating the damping force, the variation characteristics of the damping force in the low piston stroke range becomes substantially proportional to square of the piston stroke speed S ($S^2$) as shown in region (2) of FIG. 4(B).

When the piston stroke speed is increased to increase pressure difference, a greater force is exerted on the second stage disc valve 5g for causing the latter to deform for increasing the fluid flow path area. The fluid pressure difference at which the second stage disc valve starts to deform is referred as a relief point p. As is clear from FIG. 4(B), the damping force increasing rate at the second stage disc valve 5g is thus small in the low piston stroke speed range. After reaching the turning point p where the second stage disc valve 5g starts to open, the variation characteristics becomes substantially proportional to two-thirds power of the piston speed as shown in the region (4) of FIG. 4(B).

Figure 4C:
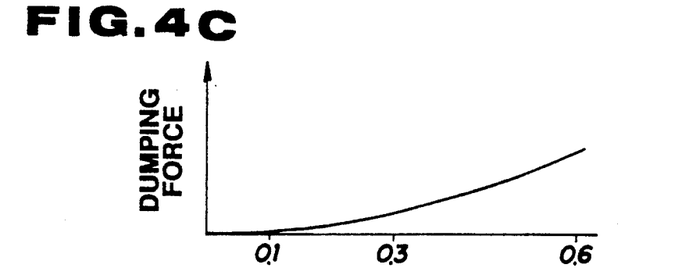
FIG. 4(C) shows damping characteristics of flow restriction orifice.

In addition to the above, the inner axial path 503 serves as a constant orifice for generating an additional damping force. As can be seen from FIG. 4(C), since the path area of the inner axial path 503 is held constant, the variation characteristics to be generated by this inner axial path 503 is substantially proportional to the square of the piston stroke speed.

Figure 5:
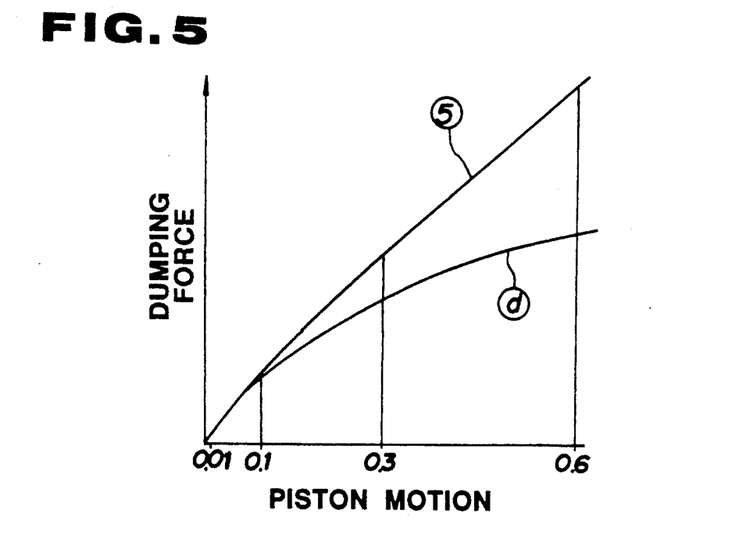
FIG. 5 is a graph variation of damping force generated by the shock absorber in relation to piston stroke speed.

Therefore, by a combination of the first stage and second stage disc valves 5d and 5g, and the inner axial opening 503, essentially linear variation characteristics as shown in FIG. 5 can be provided. Such linear characteristics of the variation of the damping force provided by the preferred embodiment of the shock absorber is effective for obtaining better vehicular body attitude stabilization capacity when the shock absorber is applied as a component of the automotive suspension system, with satisfactorily high response. Particularly, the invention is particularly effective in damping relatively low speed piston stroke. Furthermore, according to the shown embodiment, since the variation characteristics of the damping force is essentially linear in the shown embodiment, high vehicular driving stability can be obtained.

Furthermore, in order to enhance the damping characteristics in the piston stroke speed, the relief point p of the second stage disc valve 5g is to be risen. In order to set the relief point p at a higher point (higher pressure difference), it is preferable to provide higher initial resiliency for the second stage disc valve without changing a spring coefficient thereof. For this, the shown embodiment provides a predetermined magnitude of pre-load for providing an initial deformation of the second stage disc valve 5g by shifting or offsetting the seat point between the seat surface 506 and the second stage disc valve. By providing a pre-load, a resilient force of the second stage disc valve at the initial position resisting against the deformation force exerted thereonto by pressure difference between the upper and lower fluid chamber, is increased. As a result, the relief point p becomes higher as shown by broken line and point p′, as shown in the region (6) of FIG. 4(B). Therefore, by adjusting the offset magnitude $H_1$, the relief point p can be set at a desired point. This can be compared with the characteristics obtained from the conventional construction as shown by the one-dotted line b of FIG. 4(B).

On the other hand, in the piston bounding stroke, the piston strokes while compressing the lower fluid chamber 1b generate a fluid pressure difference between the upper and lower fluid chambers and between the lower fluid chamber 1b and the fluid reservoir chamber 7. As a result, fluid flow toward the upper fluid chamber 1a and toward the fluid reservoir chamber 7 from the lower fluid chamber 1b is generated. Then, the first and second stage disc valves 4f and 4c acting as third and fourth valve means for the assembly, become effective for generating damping a force varying according to generally linear characteristics as set forth with respect to the valve assembly of the piston.

During this piston bounding stroke, the piston ring 11 and the seal ring 12 are effective for assuring a leak tight seal for avoiding lowering of the damping force at the initial stage of the piston stroke.

Similarly to the foregoing piston valve assembly, by adjusting an offset magnitude $H_2$, the relief point of the second stage disc valve 4c can be adjusted for obtaining desired damping characteristics. Therefore, desired damping characteristics can be obtained for damping bounding piston stroke.

Figure 6:
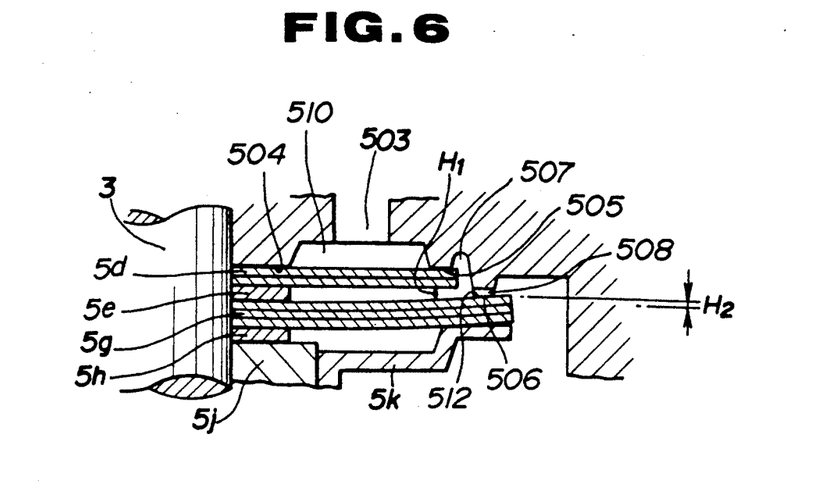
FIG. 6 is an enlarged section of a piston valve assembly in the modified embodiment of shock absorber according to the present invention.

FIG. 6 shows a modification of the foregoing first embodiment of the shock absorber according to the present invention. As can be seen from FIG. 6, the shown embodiment is constructed by neglecting the stopper plate for restricting magnitude of deformation of the first stage disc valve 5d. Therefore, in this embodiment, the second stage disc valve 2g serves as a stopper for restricting deformation magnitude of the first stage disc valve.

According to the shown embodiment, in order to adjust the deformation stroke $H_1'$ of the first stage disc valve 5d, the seating point 512 between the seat surface 506 and the second stage disc valve 5g is offset upwardly in a magnitude $H_2'$. By this construction, in the medium piston stroke range in which the first stage disc valve 5d is held in a fully open position and the second stage disc valve 5g is still held in a closed position, a greater rate of variation of damping force in relation to the piston stroke speed can be obtained. On the other hand, after starting deformation of the second stage valve 5g, the first stage disc valve 5d is again permitted to deform for lowering the increasing rate of the damping force. At the same time, since the second stage disc valve is deformed, the damping characteristics at the second stage disc valve become proportional to the two-thirds ($\frac{2}{3}$) power of the piston stroke speed. As a result, in the high piston stroke speed range, variation rate of the damping force relative to the piston stroke speed becomes smaller.

Figure 7:
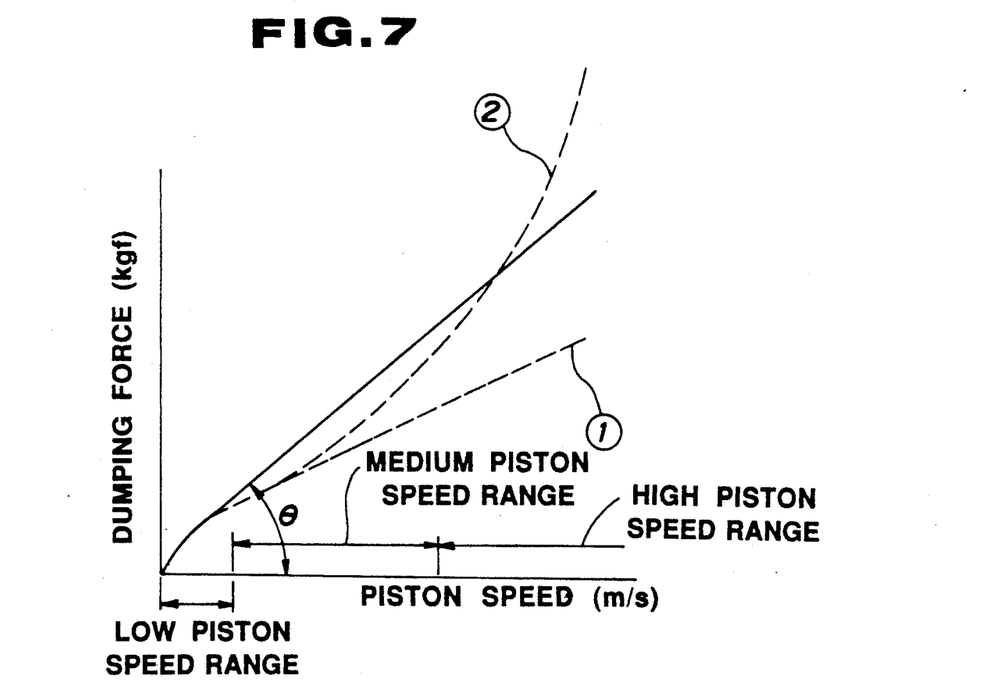
FIG. 7 is a graph showing damping characteristics of the modified embodiment of the shock absorber in comparison with damping characteristics of the conventional shock absorbers.
Figure 8:
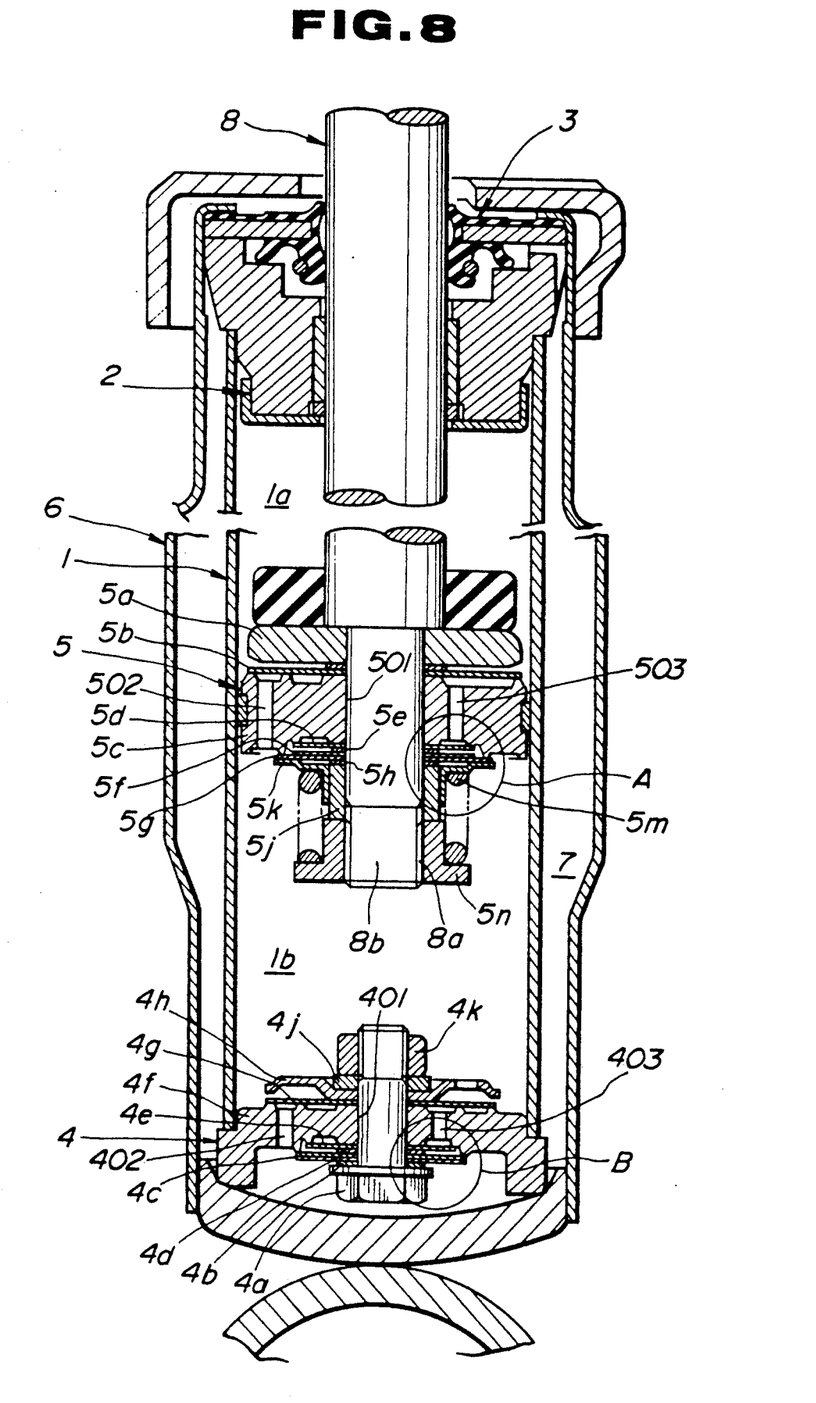
FIG. 8 is a section of another embodiment of a shock absorber according to the present invention.
Figure 9:
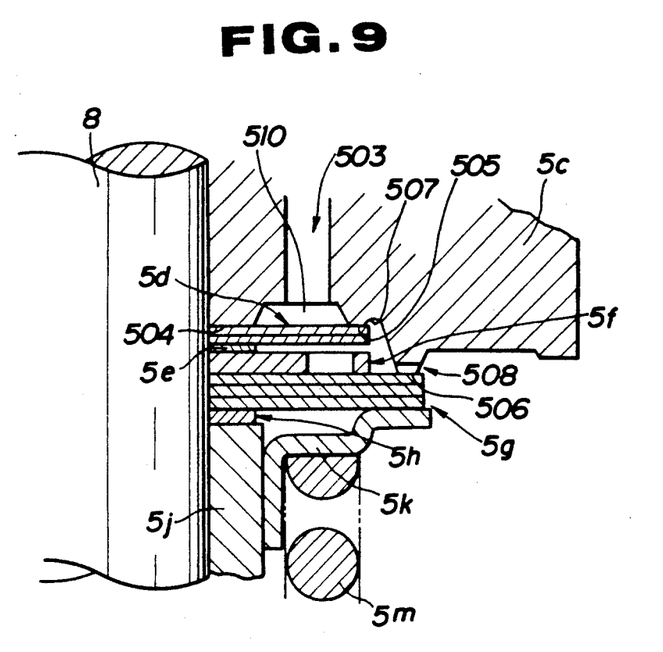
FIG. 9 is an enlarged section of the major part of a piston employed in another embodiment of the shock absorber of FIG. 8, which is the detail in the encircled portion A in FIG. 8.

Therefore, the damping characteristics as shown by solid line in FIG. 7 can be obtained. In FIG. 7, the damping characteristics obtained by the shown embodiment is compared with the characteristics as shown by broken lines (1) and (2). The broken line (1) shows damping characteristics of in the conventional disc valve which is not limited to the deformation magnitude. On the other hand, the broken line (2) shows an example of damping characteristics obtained by adjusting the axial opening flow path area. In such case, though the greater variation rate of the damping force can be obtained in the medium piston speed range, it becomes possible to provide a smaller damping force variation rate. Therefore, improved piston stroke speed dependent damping characteristics can be obtained in the shock absorber.

FIGS. 8 through 11 shows another embodiment of the shock absorber according to the present invention. In this embodiment the first stage disc valve 5d and the stopper plate 5f are formed to have an external diameter $\phi D_1$ which is greater than the external diameter $\phi S_1$ of the seat surface 505 so that the circumferential edges extend from the outer circumferential edge of the seat surface 505 in a magnitude of $S_3$. Similarly, the first stage disc valve 4e of the bottom valve is also provided with greater external diameter than that of the mating seat surface.

Figure 10:
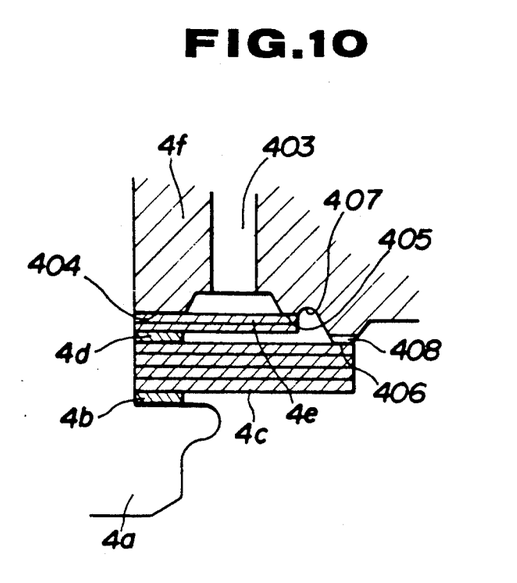
FIG. 10 is a further enlarged section of the major part of a piston valve assembly of FIG. 9, in which is shown a dimensional relationship of the components in the piston valve assembly.
Figure 11:
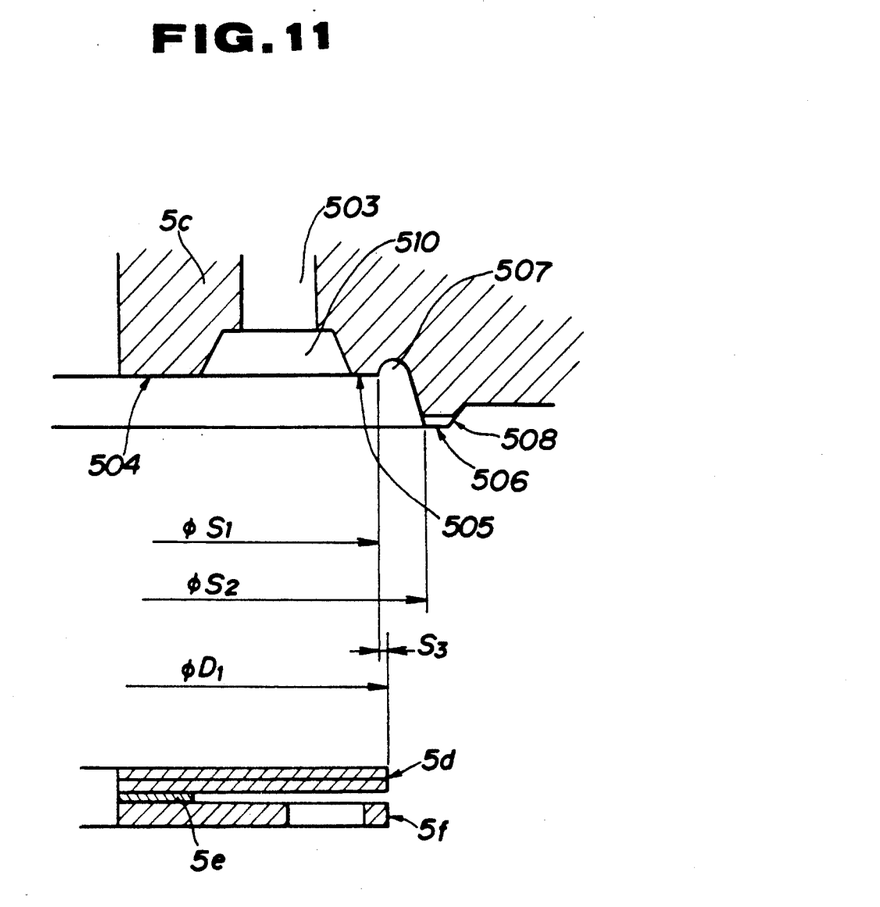
FIG. 11 is an enlarged section of the major part of a bottom valve employed in the another embodiment of the shock absorber of FIG. 8, which illustrates detailed construction of the encircled portion B in FIG. 8.

With this construction, the extra margin provided for the first stage disc valve may compensate tolerance in formation of the seat surface or the first disc valve and thus assure seating contact.

In addition, by providing semi-circular grooves 507 and 407 for the piston body 5c and the fitting body 4f, the stiffness at inner and outer circumferential edges of the seat surface becomes even in sintering process for providing higher cavitation resistance.

While the present invention has been disclosed in terms of the preferred embodiment in order to facilitate a better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A hydraulic shock absorber comprising:
a hollow cylinder filled with a working fluid;
a piston thrustingly disposed within the interior space of said cylinder for defining first and second fluid chambers;
a fluid communication means for establishing fluid communication between said first and second chambers;
a flow restrictive first valve means associated with said fluid communication means for generating a first damping force in response to piston stroke in one direction, said first valve means generating said first damping force according to a first variation characteristic when the piston stroke speed is lower than a first criterion and according to a second variation characteristics when the piston stroke speed becomes in excess of said first criterion;
a flow restrictive second valve means associated with said fluid communication means and arranged in series with said first valve means, for generating a second damping force in response to piston stroke in said one direction, said second valve means generating said second damping force according to a third variation characteristic when the piston stroke speed is lower than a second criterion and according to a fourth variation characteristic when the piston stroke speed becomes in excess of said second criterion; and
means for pre-loading said second valve means for adjusting said second criterion for setting a transition point between said third and fourth variation characteristics, said pre-loading means deforming a circumferential edge portion of said second valve means.

2. A shock absorber as set forth in claim 1, wherein said first criterion is set at a lower piston stroke speed than said second criterion.

3. A shock absorber as set forth in claim 1, wherein said first variation characteristic has a greater gradient than that of said second variation characteristic in the piston stroke speed range lower than the first criterion, and said third variation characteristic has a smaller gradient than that of said fourth variation characteristic in the piston speed range lower than the second criterion.

4. A shock absorber as set forth in claim 1, wherein said pre-loading means comprises a seat surface offset from an orientation perpendicular to an axis of the shock absorber for forcingly bending the circumferential edge portion of the second valve means for exerting said pre-loading.

5. A shock absorber as set forth in claim 1, wherein said pre-loading means comprises a seat surface offset from an orientation perpendicular to an axis of the shock absorber for forcingly bending the second valve means for exerting said pre-loading.

6. A shock absorber as set forth in claim 4, wherein said pre-loading means causes deformation of said second valve means in a direction away from said first valve means for exerting said pre-loading.

7. A shock absorber as set forth in claim 5, wherein said pre-loading means causes deformation of said second valve for pre-loading, and said second valve means as seated on said seat surface serving as means for restricting deformation of said first valve means.

8. A shock absorber as set forth in claim 1, wherein said second valve means is provided with a greater external diameter than the diameter of an outer circumferential edge of a seat surface, on which said second valve means is seated while the piston stroke speed is lower than said second criterion.

9. A shock absorber as set forth in claim 1, wherein said first valve means comprises a first window opening defined on said said piston and communicated with said fluid path, said window opening being surrounded by a first land having a first surface, and a first resilient valve means resiliently biased toward said surface for normally establishing sealing contact with said first surface and responsive to fluid flow in a first flow direction generated by the piston stroke in said one stroke direction for forming a first flow restrictive path for fluid communication from said first window opening and one of said first and second fluid chambers for generating said first damping force, and a second window opening formed on said piston in fluid communication with said first window opening, said second window opening being defined by a second land with a second surface, and a second resilient valve means resiliently biased toward said second surface for normally establishing sealing contact with said second surface and responsive to fluid flow in a first flow direction generated by the piston stroke in said one stroke direction for forming a second flow restrictive path for fluid communication between said first and second window openings for generating said second damping force.

10. A shock absorber as set forth in claim 1, which further comprises third and fourth valve means provided for generating damping force in response to a fluid flow in a second direction opposite to said first direction, said third and fourth valve means being arranged in series and being so designed as to establish essentially linear variation characteristics of damping force depending upon piston stroke speed.

11. A shock absorber as set forth in claim 10, wherein said said third valve means is responsive to piston stroke for generating a third damping force variable according to a first variation characteristic in relation to variation of the piston stroke speed in a piston stroke speed range lower than a third criterion and according to a second variation characteristic when the piston stroke speed is in excess of said third criterion, and said fourth valve means is responsive to the piston stroke for generating fourth damping force variation according to a third variation characteristics in relation to variation of the piston stroke speed when said piston stroke speed is lower than a fourth criterion and according to a fourth variation characteristics when said piston stroke speed is in excess of said fourth criterion, third valve means comprises a third window opening defined on said said piston and communicated with said fluid path, said window opening being surrounded by a third land having a third surface, and a third resilient valve means resiliently biased toward said surface for normally establishing sealing contact with said third surface and responsive to fluid flow in a second flow direction generated by the piston stroke in the other stroke direction for forming a third flow restrictive path for fluid communication from said third window opening and one of said first and second fluid chambers for generating said third damping force, and a second window opening formed on said piston in fluid communication with said third window opening, said fourth window opening being defined by a fourth land with a fourth surface, and a fourth resilient valve means resiliently biased toward said fourth surface for normally establishing sealing contact with said fourth surface and responsive to fluid flow in a second flow direction generated by the piston stroke in said the other stroke direction for forming a fourth flow restrictive path for fluid communication between said first and fourth window openings for generating said fourth damping force.

12. A shock absorber as set forth in claim 1, wherein said pre-loading means includes at least a flow path therethrough for allowing passage of said working fluid.

* * * * *